Jan. 24, 1939.   H. K. RIGDON   2,144,852
METHOD OF AND APPARATUS FOR PRODUCING REFRACTORIES
Filed Feb. 12, 1938   2 Sheets-Sheet 1
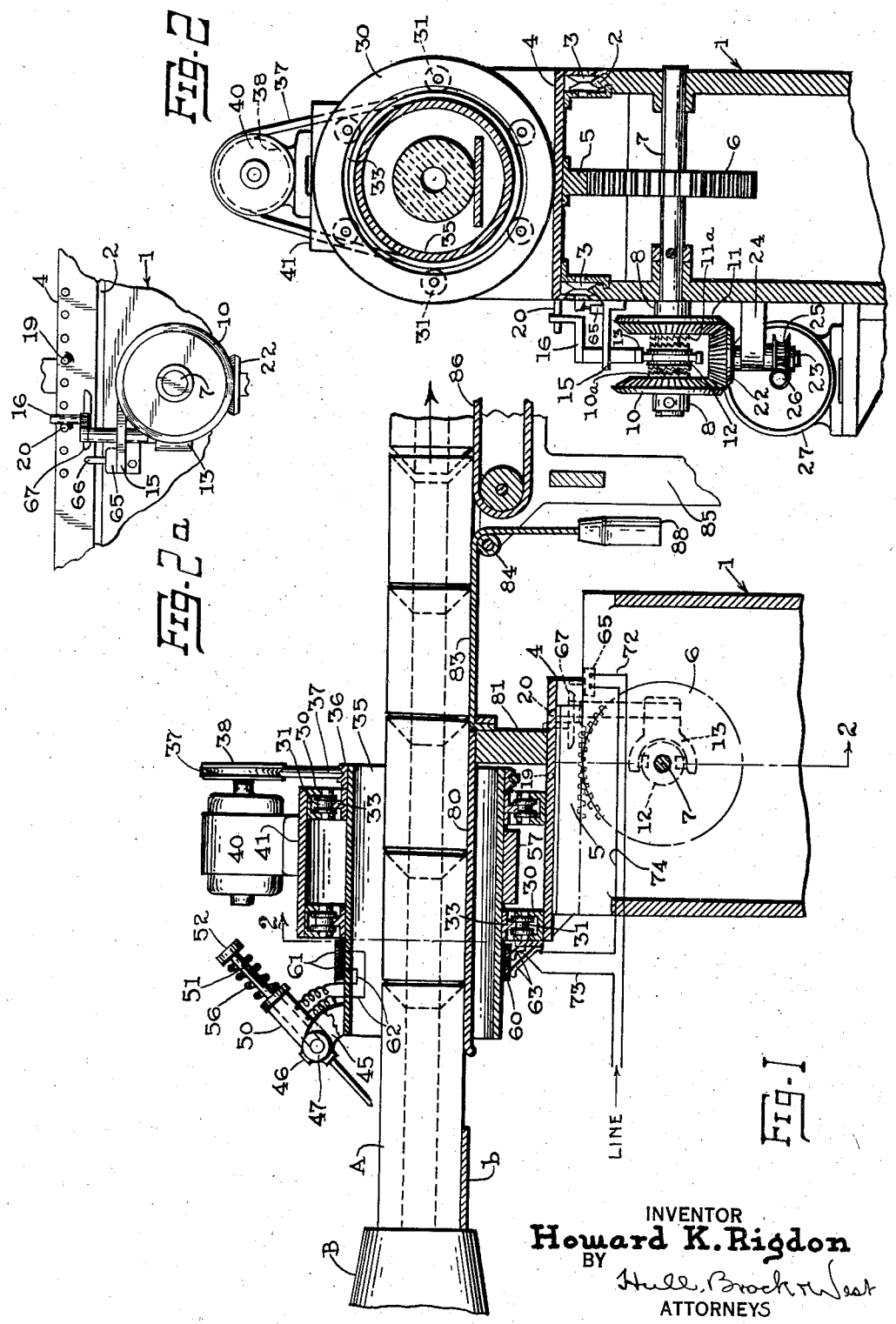
INVENTOR
Howard K. Rigdon
BY
ATTORNEYS Jan. 24, 1939. H. K. RIGDON 2,144,852
METHOD OF AND APPARATUS FOR PRODUCING REFRACTORIES
Filed Feb. 12, 1938 2 Sheets-Sheet 2
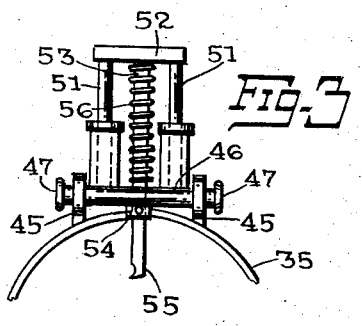
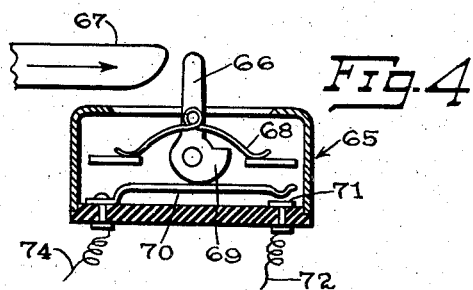
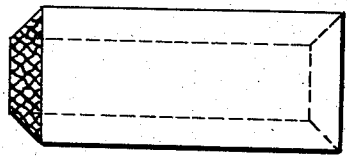
Fig. 5
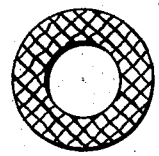
Fig. 6
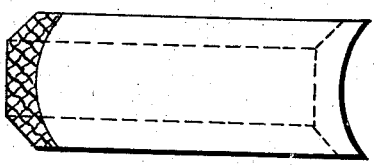
Fig. 7
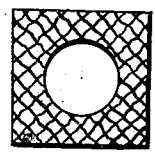
Fig. 8
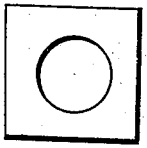
Fig. 9
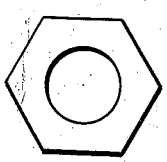
Fig. 10
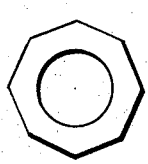
Fig. 11
INVENTOR
Howard K. Rigdon
BY
ATTORNEYS

Patented Jan. 24, 1939

2,144,852

UNITED STATES PATENT OFFICE

2,144,852

METHOD OF AND APPARATUS FOR PRODUCING REFRACTORIES

Howard K. Rigdon, Painesville, Ohio

Application February 12, 1938, Serial No. 190,268

8 Claims. (Cl. 25—105)

This invention has general reference to the manufacture of refractories of the class used in the iron and steel industries. More specifically it relates to a method of and apparatus for producing refractory conduit sections—especially those known to the trade as "sleeves" and "runner brick"—having their opposite ends shaped to provide the entering and receiving members of a so-called male and female joint. Sleeves, it may be explained, are used to enclose and protect the metal rods of ladle stoppers; while runner brick are employed in the distributing systems through which molten metal is conveyed from a central pouring location to a plurality of widely separated molds. My invention, however, is not restricted to the making of these specific articles, but may be used in the production of any objects from an elongated piece of clay or other plastic material to the cutting of which the invention is adapted.

Heretofore such conduit sections as sleeves and runner brick having joints of the kind aforesaid have been formed and punched individually in pressure dies or molds from slugs of clay previously cut to appropriate size from an extruded column.

It is the broad purpose of the invention, therefore, to provide an effective method of and apparatus for cutting a column of clay or other plastic material into pieces or sections of desired length.

A somewhat more limited object is to provide a means and method suited to the extrusion process by which the extruded column may be severed with a clean cut into sections of accurate desired length while the column is in motion.

A still more specifc object is to provide a method of and apparatus for cutting an extruded hollow clay column into sections of desired length as the column is being fed from the die or nozzle of the extruding machine and in such manner that the adjacent ends of adjoining sections will constitute the entering and receiving members of an interfitting or interlocking joint. Thus by the means and method of my invention I am enabled, simultaneously with the cutting of the column into sections, to produce by a single cut the members of a so-called male and female joint.

Briefly, the apparatus comprises a carriage or table reciprocable longitudinally of the column; a tool support mounted on the carriage or table for rotation about the column substantially on the axis thereof; a tool arranged on the support to penetrate the column, with means for reciprocating the carriage and causing it to travel with and at the precise speed of the column in one direction; means for rotating the tool support, desirably at a relatively high rate of speed, and means for projecting the tool during travel of the carriage in said direction and effecting its retraction at or near the end of such travel.

A further object of the invention is to provide an adjustment for the tool whereby its angular relation to the longitudinal axis of the column may be varied in order to produce either straight ends at right angles to the axis of the column, in case such should be desired, or to produce interfitting joints of different depths.

After the sections have been cut their end surfaces may be roughened or corrugated, if desired, by a suitable impression tool, scoring device, or otherwise, to prevent slippage or movement between the members of the joint. Also, a refractory cement or similar bonding material, including loam, may be used between the joint members to make the seal more effective.

The foregoing objects and advantages, with others hereinafter appearing, are attained in the embodiment of the invention illustrated in the accompanying drawings wherein Fig. 1 is a fragmentary sectional side elevation of apparatus embodying the invention; Fig. 2 is a section on the line 2—2 of Fig. 1; Fig. 2$^a$ is a detail from the reverse side of Fig. 1; Fig. 3 is a view of the tool supporting and projecting means; Fig. 4 is a sectional detail of the switch that controls the circuit to the solenoids of the tool projecting means; Figs. 5 and 6 are a side elevation and an end view, respectively, of a sleeve produced in accordance with the method, and by the apparatus, of my invention; Figs. 7 and 8 are corresponding views of a runner brick similarly produced, and Figs. 9, 10 and 11 show representative cross sections of columns to the cutting of which the invention is adapted.

In Fig. 1 a clay column A is shown as being projected from the die or nozzle B of a clay treating and extruding machine across a stationary pallet b.

The apparatus, according to the present embodiment of the invention, includes a frame structure designated generally by the reference numeral 1, the upper edges of whose sides are formed to provide rails 2 on which is movably supported, through the intervention of grooved rollers 3, a carriage or table 4. To the under side of the table is secured a rack 5 that meshes with a spur gear 6 secured to a shaft 7 that is journaled in bearing apertures in the sides of the frame structure 1. Where the shaft extends beyond one side of the frame structure it has mounted on it for free rotation, between collars 8, bevel gears 10 and 11 having clutch faces 10a and 11a, respectively. Splined to the shaft between the clutch faces 10a and 11a is a clutch member 12 that is adapted to be shifted into engagement with one or the other of the faces 10a and 11a by a fork 13 secured to a vertical shaft that is journaled in a bracket 15 and has a crank arm 16 secured to its upper end. Adapted to engage the crank arm are pins 19 and 20 that project from the side of the table. These pins are desirably adjustable lengthwise of the table for a reason that will presently appear. Meshing with the bevel gears 10 and 11 is a bevel pinion 22 on the upper end of a shaft 23 that is supported in a vertical position by a bracket 24 that extends from the adjacent side of the frame structure 1, and meshing with a worm gear 25 on the lower end of said shaft is a worm 26 that is carried by the shaft of a motor 27 shown as supported from the side of the frame structure. The motor 27 is a variable speed motor and it is evident, through the connections described, that it will drive the bevel gears 10 and 11 in opposite directions.

Supported by and spaced apart longitudinally of the table or carriage 4 are annular inwardly facing channels 30 that support, at points spaced circumferentially thereof, grooved rollers 31. Rotatably supported by these rollers, through annular tracks 33, is a drum that constitutes the tool support designated 35. To one end of the drum is secured a grooved ring or sheave 36 that has driving connection, through a belt 37 with a pulley 38 on the shaft of a motor 40 that is mounted on a platform 41 sustained by the annular channels 30. Carried by and projecting outwardly beyond the end of the tool support opposite the sheave 36 are brackets 45 (Figs. 1 and 3) by and between which is adjustably supported a head 46. Trunnions of the head extend through the brackets 45 and are threaded therebeyond for the application of nuts 47 shown as incorporating hand wheels for convenient manipulation. Solenoids 50 are supported by the head 46 and fastened to the outer ends of their cores 51 is a cross beam 52 to the center of which is secured a plunger 53 that has its opposite end guided through a central opening of the head 46. Within the socketed end 54 of the plunger is removably secured the shank of a cutting tool 55. A spring 56 surrounds the plunger and is compressed between the head 46 and the cross beam 52 and tends to hold the tool in retracted position when the solenoids 50 are deenergized. To counterbalance the weight of the tool operating means just described, a weight 57 may be attached to the side of the support 35 opposite that from which the brackets 45 extend.

Surrounding the tool support is a band 60 of insulating material that carries contact rings 61 shown in Fig. 1 as having electrical connection through conductors 62 with the windings of the solenoids 50. Engaging the rings 61 are contact fingers or brushes 63 supported by and insulated from the channel 30 nearest said rings. Shown as mounted on the bracket 15 is a switch 65 (Figs. 1, 2, 2a and 4) whose operating lever 66 is in the path of a cam rail 67 that is fastened to the side of the table or carriage 4. The operating lever 66 is biased toward neutral position, in which position it is shown in the drawings, by a spring 68, and when the lever is forced to the right, as the parts are viewed in Figs. 1 and 4, its cam portion 69 will depress a spring contact member 70 into engagement with a contact member 71 which has electrical connection, through a conductor 72 (Fig. 1) with a suitable source of current designated "Line". Electrical connection is also made between said source and one of the brushes or fingers 63 through a conductor 73, while the other finger or brush has connection, through a conductor 74, with the contact spring 70 of the switch. It is clear from Fig. 4 that when the operating lever 66 of the switch is swung to the left, it will have no effect upon the spring contact member 70.

A movable pallet 80 is non-rotatably supported within the tool support 35, and in the plane of the stationary pallet b, by a standard 81 that is carried by the table 4. Attached to the standard in the plane of the pallet 80 is a flexible apron 83 that is engaged over a roller 84, supported by the frame 85 of a conveyor 86. This conveyor has its top flight in the plane of the apron and is desirably driven in the customary manner at a speed somewhat in excess of that of the extruded column A. The apron 83 is retained taut by a weight 88 that is applied to is free end.

Operation

In considering the operation of the apparatus it will be assumed that the extruding machine is in action thereby to project the column A of clay across the pallet b at a given rate of speed, and that the motors 27 and 40 are energized, the former to drive the gears 10 and 11 in opposite directions and at the proper speed to effect movement of the table or carriage 4 in one direction at the same rate of speed as the column A. The tool support 35, being driven by the motor 40, rotates at relatively high speed to whirl the cutting tool 55 about the column. When the table 4 is at the end of its stroke nearest the extruding machine, the pin 20 engages the crank 16 and swings it in a direction to move the clutch member 12 into driving engagement with the clutch face 10a of the bevel gear 10. This will cause the shaft 7 and consequently the gear 6 to be rotated in a direction to feed the table or carriage 4 to the right, or in the direction of movement of the column A, at the speed of the column. Immediately after the start of the table in this direction the cam rail 67 engages the operating lever 66 of the switch 65 and swings the lever over against the action of the spring 68 and in a direction to depress, through its cam portion 69, the contact spring 70 into engagement with the contact member 71. When this occurs current flows from the line through conductor 72, spring contact member 70, conductor 74, one of the contact fingers or brushes 63 to the corresponding contact ring 61, thence by way of the conductor 62 through the windings of the solenoid and back to the source through the other contact ring and brush and conductor 73. The energization of the solenoids cause them to retract their cores 51 and move the cross bar 52, with the plunger 53 and tool 55, toward and into the clay column A, thereby to cut a section from the column, it being remembered that while this is taking place the tool support 35 is being rapidly rotated about the column by the motor 40. The taper of the cut relative to the longitudinal axis of the column is determined by the angle at which the head 46 is clamped between the brackets 45, and this angle may be changed at will by loosening the nuts 47, adjusting the head to the desired position and tightening up the nuts to clamp it in its newly adjusted position. As the head is shown adjusted in the drawings it produces a cut of about 45° to the axis of the column, producing a conical end on the severed section and a correspondingly shaped recess in the end of the column. When the table 4 travels half the distance corresponding to the length of the sections into which the column is to be cut the other pin 19 on the table engages the crank 16 and swings the crank in a direction to engage the clutch member 12 with the clutch face 11ᵃ of the bevel gear 11 which will cause the table to move in a counter direction to that of the column until it arrives again at its starting point as shown in the drawings, when the foregoing cycle will be repeated.

As the table reached the end of the cutting stroke the cam rail 67 withdrew from the operating lever 66 of the switch 65, allowing the spring 68 to return the lever to its neutral position thereby effecting the opening of the switch and the breaking of the circuit to the solenoids 50. Deenergization of the solenoids resulted in the spring 56 retracting the cutting tool, in which position it remains during the return of the table due to the fact that engagement of the switch lever by the cam rail while the table is traveling in the latter direction has no effect upon the spring contact member 70 of the switch. As the table reciprocates, the flexible apron 83 yields to the varying distance between the table and the frame of the conveyor. By reason of the fact that the conveyor 86 travels at a faster rate of speed than the column, it slightly separates the sections into which the column has been cut. Obviously, by adjusting the pins 19 and 20 toward and from each other (provision for which is found in the series of holes along the table 4 (Fig. 2ᵃ)), sections or refractories of different lengths may be produced.

After the sections have been removed from the conveyor, their ends may be roughened or corrugated, as indicated in Figs. 5 to 8, by means of a suitable implement.

Having thus described my invention, what I claim is:

1. The method of cutting a column of plastic material into sections while the column is being emitted from an extruding machine which consists in creating relative rotation between the column and a cutting tool substantially on the longitudinal axis of the column and reciprocating the tool along a course parallel to that of the column, the tool moving in one direction with and at the same speed as the column, and, while the tool is moving in said direction, thrusting the tool into the column approximately radially of said axis.

2. The method of cutting a column of plastic material into sections having interfitting joints while the column is being emitted from an extruding machine, said method consisting in creating relative rotation between the column and a cutting tool substantially on the longitudinal axis of the column and reciprocating the tool along a course parallel to that of the column, the tool moving in one direction with and at the same speed as the column, and, while the tool is moving in said direction, thrusting the tool into the column approximately radially of said axis and at other than right angles thereto, and then retracting the tool before movement thereof in the opposite direction is started.

3. The method of cutting a column of plastic material into sections while the column is being emitted from an extruding machine which consists in rotating a cutting tool about the column at a relatively high rate of speed and reciprocating the tool along a course substantially parallel to that of the column, the tool moving in one direction with and at the same speed as the column, and, while the tool is moving in said direction, thrusting the tool into the column approximately radially of said axis, and retracting the tool before movement thereof along said course in the opposite direction.

4. Apparatus for cutting a column of plastic material into sections while the column is being emitted from an extruding machine, said apparatus comprising a tool support, means sustaining the same for rotation about the column substantially on the longitudinal axis thereof and for reciprocation along the column, a tool reciprocably carried by the support in a position to penetrate the column substantially radially thereof, means reciprocating the tool support and causing it to travel in one direction with and at the same speed as the column, means for rotating the tool support, and means for projecting the tool into the column substantially radially thereof while the tool support is moving in the aforesaid direction, and for effecting retraction of the tool before the support moves in the opposite direction.

5. Apparatus for cutting a column of plastic material into sections having interfitting joints while the column is being emitted from an extruding machine, said apparatus comprising a tool support, means sustaining the tool support for rotation about the column on substantially the longitudinal axis thereof and for reciprocation along the column, means for rotating the tool support, means for reciprocating the tool support and causing it to travel in one direction with and at the same speed as the column, a tool carried by the support for longitudinal movement substantially radially of the column, means for adjusting the tool to vary its angular relation to the longitudinal axis of the column, means for projecting the tool into the column during movement of the tool support in the aforesaid direction, and further means effecting retraction of the tool before the support is moved in the opposite direction.

6. Apparatus for cutting a column of plastic material into sections while the column is being emitted from an extruding machine, said apparatus comprising a tool support, means sustaining the same for rotation about the column on substantially the longitudinal axis thereof and for reciprocation along the column, means for rotating the tool support, means for reciprocating the tool support and causing it to travel in one direction with and at the same speed as the column, a tool carried by the support for longitudinal movement substantially radially of the column, a solenoid for projecting the tool into the column, a spring for retracting the tool, an electric circuit including the winding of the solenoid and a switch, and means serving to close the switch during movement of the tool support in the aforesaid direction.

7. Apparatus for cutting a column of plastic material into sections while the column is being emitted from an extruding machine, said apparatus comprising a tool support, means sustaining the same for rotation about the column on substantially the longitudinal axis thereof and for reciprocation along the column, means for rotating the tool support, means for reciprocating the tool support and causing it to travel in one direction with and at the same speed as the column, a tool carried by the support for longitudinal movement substantially radially of the column, electromagnetic means for actuating the tool to thrust it into the column, means acting to retract the tool when the electromagnetic means is de-energized, an electric circuit including said electromagnetic means and a make-and-break device, and means actuating said device to close the circuit during movement of the tool support in the aforesaid direction.

8. Apparatus for cutting a column of plastic material into sections while the column is being emitted from an extruding machine, said apparatus comprising a tool support, means sustaining the same for rotation about the column on substantially the longitudinal axis thereof and for reciprocation along the column, means for rotating the tool support, means for reciprocating the tool support and causing it to travel in one direction with and at the same speed as the column, a tool carried by the support for longitudinal movement substantially radially of the column, and power means automatically actuated for thrusting the tool into the column during movement of the tool support in the aforesaid direction.

HOWARD K. RIGDON.